(12) United States Patent
Jain et al.

(10) Patent No.: US 11,740,910 B2
(45) Date of Patent: *Aug. 29, 2023

(54) VIRTUAL MACHINE BOOT DATA PREDICTION

(71) Applicant: Cohesity, Inc., San Jose, CA (US)

(72) Inventors: Ayushi Jain, Bengaluru (IN); Vedant, Bengaluru (IN)

(73) Assignee: Cohesity, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/949,927

(22) Filed: Sep. 21, 2022

(65) Prior Publication Data

US 2023/0019096 A1   Jan. 19, 2023

Related U.S. Application Data

(63) Continuation of application No. 16/710,505, filed on Dec. 11, 2019, now Pat. No. 11,487,549.

(51) Int. Cl.
| | | |
|---|---|---|
| *G06F 9/4401* | (2018.01) | |
| *G06F 9/455* | (2018.01) | |
| *G06F 12/0862* | (2016.01) | |
| *G06N 20/00* | (2019.01) | |

(52) U.S. Cl.
CPC ........ *G06F 9/4401* (2013.01); *G06F 9/45558* (2013.01); *G06F 12/0862* (2013.01); *G06N 20/00* (2019.01); *G06F 2009/45583* (2013.01); *G06F 2009/45591* (2013.01)

(58) Field of Classification Search
CPC ............... G06F 9/4401; G06F 9/45558; G06F 12/0862; G06F 2009/45591; G06F 2009/45583; G06N 20/00

USPC ............................................... 713/2
See application file for complete search history.

(56) References Cited

U.S. PATENT DOCUMENTS

| | | |
|---|---|---|
| 7,421,648 B1 | 9/2008 | Davis |
| 7,437,764 B1 | 10/2008 | Sobel |
| 8,020,037 B1 | 9/2011 | Schwartz |
| 8,086,585 B1 | 12/2011 | Brashers |
| 8,112,661 B1 | 2/2012 | La France |
| 8,190,583 B1 | 5/2012 | Shekar |
| 8,312,471 B2 | 11/2012 | Davis |
| 8,364,648 B1 | 1/2013 | Sim-Tang |
| 8,607,342 B1 | 12/2013 | Liao |
| 9,268,689 B1 | 2/2016 | Chen |
| 9,304,864 B1 | 4/2016 | Bushman |
| 9,311,190 B1 | 4/2016 | Bushman |
| 9,361,185 B1 | 6/2016 | Bushman |
| 9,471,441 B1 | 10/2016 | Lyadvinsky |

(Continued)

OTHER PUBLICATIONS

"Backup Solution Guide"—Synology https://download.synology.com/download/www-res/brochure/backup_solution_guide_en-global.pdf (Year: 2019).

(Continued)

*Primary Examiner* — Brian T Misiura
(74) *Attorney, Agent, or Firm* — Van Pelt, Yi & James LLP

(57) ABSTRACT

An indication that a virtual machine is starting is received. Requested data blocks associated with the virtual machine are identified. Based on identifiers of the requested data blocks, a trained learning model is used to predict one or more subsequent data blocks likely to be requested while the virtual machine is starting. The one or more subsequent data blocks are caused to be preloaded in a cache storage.

20 Claims, 8 Drawing Sheets

(56) References Cited

U.S. PATENT DOCUMENTS

| | | | |
|---|---|---|---|
| 9,489,230 B1 | 11/2016 | Patwardhan | |
| 9,594,514 B1 | 3/2017 | Bono | |
| 9,621,428 B1 | 4/2017 | Lev | |
| 9,983,812 B1 | 5/2018 | Don | |
| 10,037,223 B2 | 7/2018 | Park | |
| 10,089,148 B1 | 10/2018 | Blitzer | |
| 10,162,528 B2 | 12/2018 | Sancheti | |
| 10,169,077 B1 | 1/2019 | Sigl, Sr. | |
| 10,175,896 B2 | 1/2019 | Battaje | |
| 10,275,321 B1 | 4/2019 | Bajaj | |
| 10,496,497 B1 | 12/2019 | Yadav | |
| 10,503,612 B1 | 12/2019 | Wang | |
| 10,545,776 B1 | 1/2020 | Kowalski | |
| 10,877,928 B2 | 12/2020 | Nagrale | |
| 10,896,097 B1 | 1/2021 | Purcell | |
| 11,036,594 B1 | 6/2021 | Shats | |
| 11,176,154 B1 | 11/2021 | Dasgupta | |
| 2003/0033344 A1 | 2/2003 | Abbott | |
| 2004/0250033 A1 | 12/2004 | Prahlad | |
| 2006/0069861 A1 | 3/2006 | Amano | |
| 2006/0182255 A1 | 8/2006 | Luck, Jr. | |
| 2007/0153675 A1 | 7/2007 | Baglin | |
| 2008/0208926 A1 | 8/2008 | Smoot | |
| 2009/0089657 A1 | 4/2009 | Davis | |
| 2009/0171707 A1 | 7/2009 | Bobak | |
| 2009/0313503 A1 | 12/2009 | Atluri | |
| 2010/0031170 A1 | 2/2010 | Carullo | |
| 2010/0070725 A1 | 3/2010 | Prahlad | |
| 2010/0106933 A1 | 4/2010 | Kamila | |
| 2010/0122248 A1 | 5/2010 | Robinson | |
| 2011/0022879 A1 | 1/2011 | Chavda | |
| 2011/0106776 A1 | 5/2011 | Vik | |
| 2011/0107246 A1 | 5/2011 | Vik | |
| 2012/0203742 A1 | 8/2012 | Goodman | |
| 2013/0006943 A1 | 1/2013 | Chavda | |
| 2013/0179481 A1 | 7/2013 | Halevy | |
| 2013/0191347 A1 | 7/2013 | Bensinger | |
| 2013/0219135 A1 | 8/2013 | Knowles | |
| 2013/0227558 A1 | 8/2013 | Du | |
| 2013/0232480 A1 | 9/2013 | Winterfeldt | |
| 2013/0232497 A1 | 9/2013 | Jalagam | |
| 2013/0254402 A1 | 9/2013 | Vibhor | |
| 2013/0322335 A1 | 12/2013 | Smith | |
| 2014/0040206 A1 | 2/2014 | Ramakrishnan | |
| 2014/0052692 A1 | 2/2014 | Zhang | |
| 2014/0059306 A1 | 2/2014 | Bender | |
| 2014/0165060 A1 | 6/2014 | Muller | |
| 2014/0297588 A1 | 10/2014 | Babashetty | |
| 2014/0359229 A1 | 12/2014 | Cota-Robles | |
| 2014/0372553 A1 | 12/2014 | Blackburn | |
| 2015/0193487 A1 | 7/2015 | Demidov | |
| 2015/0254150 A1 | 9/2015 | Gordon | |
| 2015/0278046 A1 | 10/2015 | Zellermayer | |
| 2015/0347242 A1 | 12/2015 | Martos | |
| 2015/0363270 A1 | 12/2015 | Hammer | |
| 2015/0370502 A1 | 12/2015 | Aron | |
| 2015/0378765 A1 | 12/2015 | Singh | |
| 2016/0004450 A1 | 1/2016 | Lakshman | |
| 2016/0034356 A1 | 2/2016 | Aron | |
| 2016/0048408 A1 | 2/2016 | Madhu | |
| 2016/0070714 A1 | 3/2016 | D Sa | |
| 2016/0085636 A1 | 3/2016 | Dornemann | |
| 2016/0125059 A1 | 5/2016 | Jain | |
| 2016/0162378 A1 | 6/2016 | Garlapati | |
| 2016/0188898 A1 | 6/2016 | Karinta | |
| 2016/0203060 A1 | 7/2016 | Singh | |
| 2016/0232061 A1 | 8/2016 | Gaschler | |
| 2016/0321339 A1 | 11/2016 | Tekade | |
| 2016/0357640 A1 | 12/2016 | Bushman | |
| 2016/0357641 A1 | 12/2016 | Bushman | |
| 2016/0357769 A1 | 12/2016 | Bushman | |
| 2017/0031613 A1 | 2/2017 | Lee | |
| 2017/0031622 A1 | 2/2017 | Nagarajan | |
| 2017/0060710 A1 | 3/2017 | Ramani | |
| 2017/0060884 A1 | 3/2017 | Goodman | |
| 2017/0123935 A1 | 5/2017 | Pandit | |
| 2017/0168903 A1 | 6/2017 | Dornemann | |
| 2017/0185491 A1 | 6/2017 | Hajare | |
| 2017/0185729 A1 | 6/2017 | Boray | |
| 2017/0193116 A1 | 7/2017 | Wong | |
| 2017/0206212 A1 | 7/2017 | Srivilliputtur Mannarswamy | |
| 2017/0212680 A1 | 7/2017 | Waghulde | |
| 2017/0337109 A1 | 11/2017 | Ramu | |
| 2018/0004437 A1 | 1/2018 | Battaje | |
| 2018/0004764 A1 | 1/2018 | Sudarsanam | |
| 2018/0060106 A1 | 3/2018 | Madtha | |
| 2018/0060187 A1 | 3/2018 | Chavda | |
| 2018/0081766 A1 | 3/2018 | Ghuge | |
| 2018/0081902 A1 | 3/2018 | McKenzie | |
| 2018/0088973 A1 | 3/2018 | Subhraveti | |
| 2018/0095846 A1 | 4/2018 | Sanakkayala | |
| 2018/0113625 A1 | 4/2018 | Sancheti | |
| 2018/0196820 A1 | 7/2018 | Kremer | |
| 2018/0212896 A1 | 7/2018 | Chang | |
| 2018/0253414 A1 | 9/2018 | Hailpern | |
| 2018/0293374 A1 | 10/2018 | Chen | |
| 2018/0316577 A1 | 11/2018 | Freeman | |
| 2018/0329637 A1 | 11/2018 | Battaje | |
| 2019/0065277 A1 | 2/2019 | Raikov | |
| 2019/0073276 A1 | 3/2019 | Yuen | |
| 2019/0108266 A1 | 4/2019 | Manvar | |
| 2019/0129799 A1 | 5/2019 | Kumarasamy | |
| 2019/0132203 A1 | 5/2019 | Wince | |
| 2019/0197020 A1 | 6/2019 | Yap | |
| 2019/0215358 A1 | 7/2019 | Kobayashi | |
| 2019/0220198 A1 | 7/2019 | Kashi Visvanathan | |
| 2019/0228097 A1 | 7/2019 | Kassa | |
| 2019/0278662 A1 | 9/2019 | Nagrale | |
| 2019/0278663 A1 | 9/2019 | Mehta | |
| 2020/0026538 A1 | 1/2020 | Cui | |
| 2020/0034254 A1 | 1/2020 | Natanzon | |
| 2020/0057567 A1 | 2/2020 | Hutcheson | |
| 2020/0057669 A1 | 2/2020 | Hutcheson | |
| 2020/0110755 A1 | 4/2020 | Waldman | |
| 2020/0159625 A1 | 5/2020 | Hutcheson | |
| 2020/0167238 A1 | 5/2020 | Killamsetti | |
| 2020/0183794 A1 | 6/2020 | Dwarampudi | |
| 2020/0233571 A1 | 7/2020 | Yuravlivker | |
| 2020/0278274 A1 | 9/2020 | Shetty | |
| 2020/0285449 A1 | 9/2020 | McIntosh | |
| 2020/0394072 A1 | 12/2020 | Sreekantaswamy | |
| 2021/0056203 A1 | 2/2021 | Qiao | |
| 2021/0081087 A1 | 3/2021 | Wayne | |
| 2021/0103556 A1 | 4/2021 | Nagrale | |
| 2021/0232579 A1 | 7/2021 | Schechter | |
| 2021/0318851 A1 | 10/2021 | Sahu | |
| 2021/0385254 A1 | 12/2021 | Pettit | |

OTHER PUBLICATIONS

"Recovering File from an Amazon EBS Volume Backup"—Josh Rad, AWS, Feb. 1, 2019 https://aws.amazon.com/blogs/compute/recovering-files-from-an-amazon-ebs-volume-backup/ (Year: 2019).

Actifio. "Getting Started with Actifio VDP." Sep. 23, 2020. https://web.archive.org/web/20200923181125/https://docs.actifio.com/10.0/PDFs/Introducing.pdf (Year: 2020).

C. Grace. "Site Recovery Manager Technical Overview." Dec. 1, 2020. https://web.archive.org/web/20201201181602/https://core.vmware.com/resource/site-recovery-manager-technical-overview (Year: 2020).

Cloud Endure. "Cloud Endure Documentation." Dec. 1, 2020. https://web.archive.org/web/20201201022045/https://docs.cloudendure.com/CloudEndure%20Documentation.htm (Year: 2020).

Cohesity, Cohesity Data Protection White Paper, 2016, Cohesity, pp. 1-12 (Year: 2016).

Gaetan Castlelein, Cohesity SnapFS and SnapTree, Aug. 9, 2017, Cohesity, pp. 1-4 (Year: 2017).

M. Chuang. "Announcing VMware Cloud Disaster Recovery." Sep. 29, 2020. https://web.archive.org/web/20201102133037/https://blogs.vmware.com/virtualblocks/2020/09/29/announcing-vmware-cloud-disaster-recovery/ (Year: 2020).

(56) References Cited

OTHER PUBLICATIONS

M. McLaughlin. "VMware Cloud Disaster Recovery is Now Available." Oct. 20, 2020. https://web.archive.org/web/20201103021801/https://blogs.vmware.com/virtualblocks/2020/10/20/vmware-cloud-disaster-recovery-is-now-available/ (Year: 2020).

Red Hat. "Red Hat Virtualization 4.3 Disaster Recovery Guide." Jul. 17, 2019. https://web.archive.org/web/20190717013417/https://access.redhat.com/documentation/en-us/red_hat_virtualization/4.3/html/disaster_recovery_guide/index (Year: 2019).

Red Hat. "Red Hat Virtualization 4.3 Product Guide." Jul. 17, 2019. https://web.archive.org/web/20190717013254/https://access.redhat.com/documentation/en-us/red_hat_virtualization/4.3/html/product_guide/index (Year: 2019).

VMware. "Site Recovery Manager Administration." May 31, 2019. https://docs.vmware.com/en/Site-Recovery-Manager/8.5/srm-admin-8-5.pdf (Year: 2019).

VMware. "Site Recovery Manager Evaluation Guide." Oct. 19, 2020. https://web.archive.org/web/20201019155135/https://core.vmware.com/resource/site-recovery-manager-evaluation-guide (Year: 2020).

Zerto. "Zerto Disaster Recovery Guide." Sep. 2016. https://www.zerto.com/wp-content/uploads/2016/09/Zerto-Disaster-Recovery-Guide_CIO_eBook.pdf (Year: 2016).

VIRTUAL MACHINE BOOT DATA PREDICTION

CROSS REFERENCE TO OTHER APPLICATIONS

This application is a continuation of U.S. patent application Ser. No. 16/710,505 entitled VIRTUAL MACHINE BOOT DATA PREDICTION filed Dec. 11, 2019 which is incorporated herein by reference for all purposes.

BACKGROUND OF THE INVENTION

A virtual machine may be started in response to a start command. The virtual machine has an associated boot sequence. Executing the boot sequence will result in accessing a sequence of data blocks. The data blocks of the boot sequence are interdependent on each other. The boot sequence is comprised of a plurality of data blocks. The boot sequence has an associated order in which the plurality of data blocks are used to start the virtual machine. The plurality of data blocks may be fetched from a filesystem in the associated order to start the virtual machine.

A filesystem may separately request from the disk storage each of the data blocks required by the boot sequence. The disk may spin up, locate the requested data block, and provide the requested data block to the filesystem. The filesystem may process the data block and then request the next data block included in the boot sequence. It may take a long time to start a virtual machine based on the amount of data included in the virtual machine boot sequence.

BRIEF DESCRIPTION OF THE DRAWINGS

Various embodiments of the invention are disclosed in the following detailed description and the accompanying drawings.

DETAILED DESCRIPTION

Figure 1:
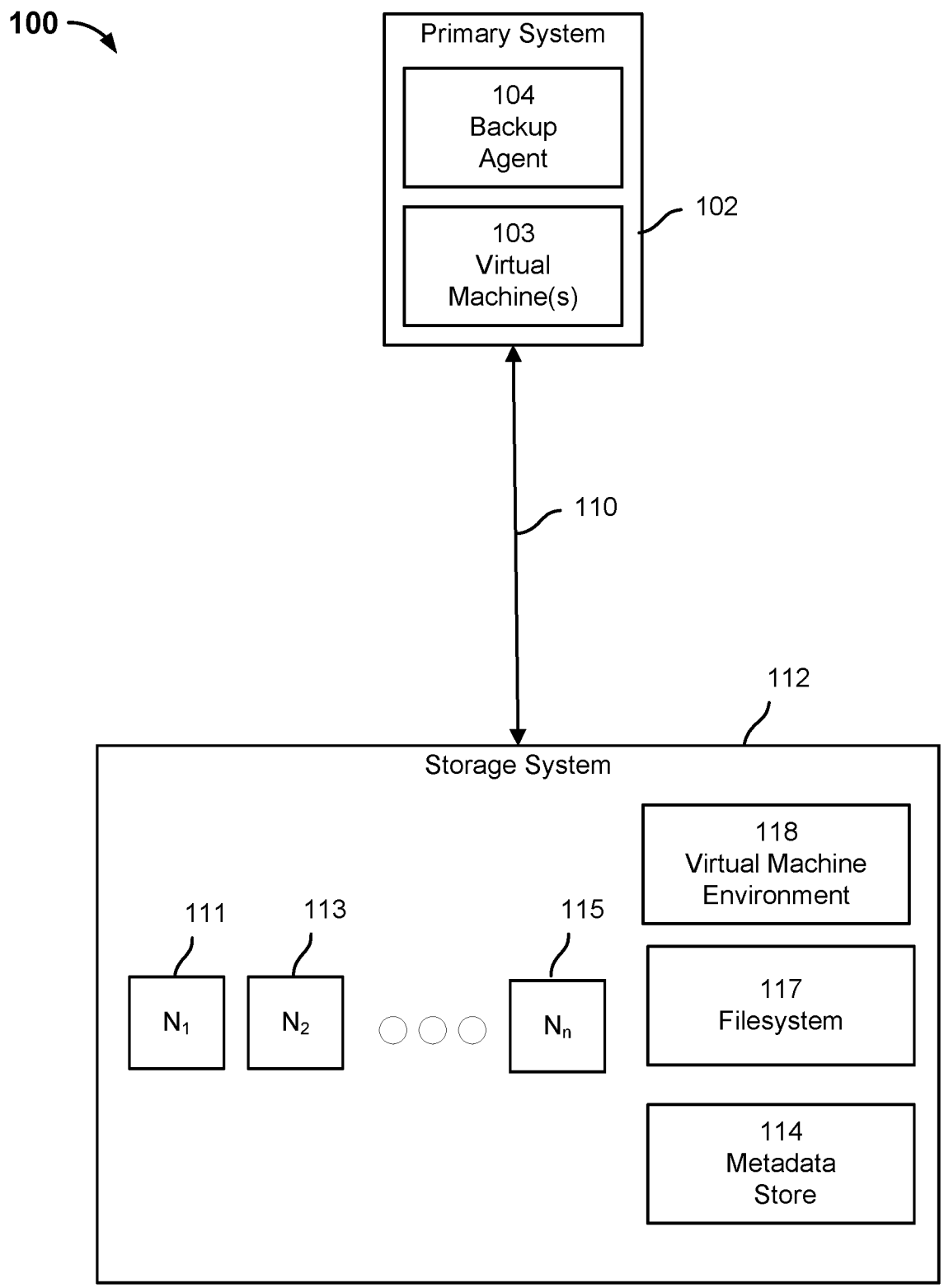
FIG. 1 is a block diagram illustrating an embodiment of a system for starting backed up versions of a plurality of virtual machines.

A virtual machine may require a certain amount of time to start. A virtual machine may use a particular boot sequence to start the virtual machine (e.g., access a specific sequence of data blocks while booting up). The data blocks included in the boot sequence may be stored in non-contiguous locations on a disk. In some embodiments, at least two of the data blocks included in the boot sequence have a same size. In some embodiments, at least two of the data blocks included in the boot sequence have a different size. A filesystem of a storage system may send to the disk individual requests for each of the data blocks included in the boot sequence. In response to a request, a disk may spin up and the requested data block is provided to the filesystem. In response to receiving the data block, the filesystem may process the data block and provide the data block to a virtual machine environment to start the virtual machine. A storage system may spin up the disk each time that a data block included in the boot sequence is requested and retrieved. The amount of time needed to start the virtual machine may depend on a length of the particular boot sequence and the number of times that a disk is spun up to retrieve the data blocks included in the boot sequence. The amount of time needed to start the virtual machine may be reduced by prefetching to a cache storage some of the data blocks included in the boot sequence. A disk may be idle (e.g., receiving no data requests) between the time a requested data block is provided to a filesystem and the filesystem requests a next data block of the boot sequence.

A storage system may store many different virtual machines (e.g., hundreds, thousands). The boot sequence associated with each of the virtual machines may be different. The storage system may also store many versions of a virtual machine. For example, a software update may occur for one of the applications associated with the virtual machine. The boot sequence associated with each of the different versions of the virtual machine may also be different. The virtual machine may also undergo one or more changes. For example, the operating system of the virtual machine may change, which may cause the boot sequence associated with the virtual machine to change. Thus, merely memorizing the boot sequence associated with a virtual machine and prefetching the memorized boot sequence may be inefficient due to incorrect pre-fetching of data blocks.

A filesystem (e.g., distributed filesystem, distributed block device system, non-distributed filesystem, etc.) may receive from an appliance on which a virtual machine may run (e.g., virtual machine environment), a request to retrieve a data block from a storage (e.g., raw disk, virtual disk, hard disk, flash drive, tape devices, offboard storage, networked storage, cloud storage, a subsystem that stores the virtual machine execution data blocks, filesystem, file exposed as a disk (e.g., using SCSI protocol), raw filesystem, etc.) during execution of the boot sequence. The filesystem may determine whether the requested data block has been prefetched to a cache storage. A prediction engine may implement a trained model to predict one or more data blocks from the storage. The trained model may predict data blocks included in a boot sequence of a virtual machine and the predicted data blocks may be prefetched from the storage to a cache storage. The predicted data blocks may be prefetched while the storage is idle (e.g., waiting for a request from the filesystem). In the event the requested data block has been prefetched to the cache storage, the filesystem may load the requested data block from the cache storage to a virtual machine environment in which the virtual machine is being started. This may reduce the amount of time to start the virtual machine because retrieving a data block from a cache storage is faster than retrieving the data block from the storage. In the event the requested data block has not been prefetched to the cache storage, the requested data block may be loaded from the storage to a virtual machine environment in which the virtual machine is being started.

A model may be trained to predict one or more data blocks in a boot sequence. A boot sequence of a virtual machine may be learned each time a virtual machine is run on a storage system. The boot sequence of the virtual machine may be monitored as the virtual machine is being started.

The monitored boot sequence may be stored and provided as an input to train a model. The model may develop a graph structure for a plurality of virtual machines. The graph structure may be comprised of a plurality of branches where each branch corresponds to one of the plurality of virtual machines. A branch may be comprised of a plurality of states. A state is in reference to a data block in a filesystem. Each state of a branch may correspond to a data block included in the boot sequence. Each subsequent state of a branch may correspond to a next data block included in the boot sequence, i.e., the first state of a branch corresponds to an initial data block of the boot sequence and a last state of the branch corresponds to the last data block of the boot sequence. Some of the branches of the graph structure may overlap, i.e., a data block is included in plurality of boot sequences. A parent state may have one or more pointers to one or more child states. In some embodiments, the graph structure may have self-referential loops and/or cycles. For example, a state may reference itself. A child state may reference an elder state (e.g., parent state or a grandparent state). In some embodiments, the model is a statistical model, such as a Markov chain based prediction model where corresponding probabilities are associated with each of the child states. For example, a parent state may include pointers to three child states. The path from the parent state to the first child state may have a first probability, the path from the parent state to the second child state may have a second probability, and the path from the parent state to the third child state may have a third probability. The corresponding probabilities may be used to predict one or more subsequent data blocks. For example, the data block corresponding to the child state with the highest probability among the three child states may be predicted as one or more subsequent data blocks. In some embodiments, the model is a machine learning model (e.g., unsupervised, supervised, linear regression, decision tree, support vector machine, naïve Bayes, random forest, etc.).

The prediction engine may monitor a boot sequence associated with a virtual machine. The prediction engine may monitor a threshold number of previous data block requests. The prediction engine may predict one or more subsequent data blocks associated with the boot sequence based on the monitored threshold number of previous data block requests. In some embodiments, the threshold number of previous data block requests is equal to two. For example, the prediction engine may monitor the requests for the second and third data blocks of the boot sequence to predict the fourth data block of the boot sequence.

A size of a cache storage is finite. The number of prefetched data blocks may be based on the size of the cache storage. The prediction engine may request that a prefetch engine prefetch the predicted subsequent data block. In some embodiments, the prediction engine may request that the prefetch engine not only prefetch the predicted subsequent data block, but also one or more other predicted subsequent data blocks of the boot sequence. For example, the prediction engine may predict that the seventh block of the boot sequence is "Block 9." The prediction engine may also predict with reasonable certainty (e.g., a probability greater than a threshold) that the eighth block of the boot sequence is "Block 25." Instead of only sending to the prefetch engine a request for "Block 9," the prediction engine may send to the prefetch engine a request for "Block 9" and "Block 25." In some embodiments, the data blocks associated with a virtual machine boot sequence are sequential. The prediction engine may request the prefetch engine to prefetch a plurality of sequential data blocks. For example, instead of only sending to the prefetch engine a request for "Block 9," the prediction engine may send to the prefetch engine a request for "Block 9" and "Block 10." The prediction engine may vary the number of requested data blocks with each request based on a probability associated with the one or more subsequent data blocks. For example, the prediction engine may request one data block, then two data blocks, then one data block, and then five data blocks. The one or more prefetched blocks may overwrite the one or more least recently used data blocks stored in the cache storage.

In some embodiments, the number of prefetched data blocks is the maximum number of data blocks capable of being stored in the cache storage. For example, an end portion of the boot sequence (e.g., the last set of data blocks required by the boot sequence) is being loaded and the prediction engine, with reasonable certainty, may predict all of the data blocks included in the end portion. For example, the boot sequence of a virtual machine may be following a branch of a model where none of the states of the branch reference other states of different branches. In some embodiments, the number of prefetched data blocks is one less than the maximum number of data blocks capable of being stored in the cache storage. For example, the prefetch engine may have prefetched a data block that has yet to be loaded into a virtual machine environment associated with the virtual machine to be started. The number of prefetched data blocks may be one less than the maximum number of data blocks capable of being stored in the cache storage to prevent an already prefetched data block from being overwritten before the already prefetched data block is loaded into the virtual machine environment associated with the virtual machine to be started. In some embodiments, the number of prefetched data blocks is between one data block and less than one less than the maximum number of data blocks capable of being stored in the cache storage. In some embodiments, the number of prefetched data blocks is based on corresponding probabilities associated with the data blocks. A data block may be prefetched in the event the probability of the data block being in the boot sequence of the virtual machine is greater than a probability threshold. In some embodiments, the prefetched data blocks overwrite the least recently used data blocks stored in the cache storage.

Each time a data block associated with the boot sequence is requested, the prediction engine may re-evaluate its prediction. For example, the prediction engine may predict that a data block will be requested in a boot sequence. However, as the virtual machine continues to start, the prediction engine may determine that one of its predictions is incorrect because the predicted data block was not included in the actual boot sequence. The prediction engine may continue to monitor the boot sequence, predict one or more other data blocks to be included in the boot sequence based on the actual boot sequence, and request the one or more predicted data blocks to be prefetched.

At some point in time, the virtual machine will have started (i.e., the boot sequence has ended). The prediction engine may determine that the virtual machine has started based on a frequency at which data blocks are requested. The prediction engine may determine that the virtual machine has started in the event the frequency at which data blocks are requested is less than a threshold. Upon determining that the virtual machine has started, the prediction engine may update its prediction model based on the actual boot sequence of the virtual machine. In some embodiments, the boot sequence is determined to have ended after a threshold period of time (e.g., 1 min). In some embodiments, the boot sequence is determined to have ended when a hit/miss rate (ratio of correctly predicted data blocks to incorrectly predicted data blocks) is less than a threshold.

The start time associated with a virtual machine may be reduced in the event the prediction engine is correct in predicting one or more data blocks associated with the boot sequence of a virtual machine. The amount of time that the start time is reduced depends on an accuracy of the prediction engine. The accuracy of the prediction engine may improve over time as more virtual machines are started because the model used by the prediction engine may be updated each time a virtual machine is started.

FIG. 1 is a block diagram illustrating an embodiment of a system for starting backed up versions of a plurality of virtual machines. In the example shown, system 100 is comprised of primary system 102 that is coupled to storage system 112 via connection 110. Connection 110 may be a wired or wireless connection. Connection 110 may be a LAN, WAN, intranet, the Internet, and/or a combination thereof.

Primary system 102 may be comprised of one or more virtual machines 103 and a backup agent 104. Primary system 102 may include one or more storage volumes (not shown) that are configured to store filesystem data associated with primary system 102. The filesystem data associated with primary system 102 includes the data associated with the one or more virtual machines 103.

Backup agent 104 may be configured to cause primary system 102 to perform a backup snapshot of one of the one or more virtual machines 103. The backup snapshot may be a full snapshot or an incremental snapshot. A full snapshot may include all of the filesystem data associated with a virtual machine at a particular moment in time. An incremental snapshot may include all of the filesystem data associated with a virtual machine that was not included in a previous backup snapshot. Backup agent 104 may cause primary system 102 to perform a backup snapshot according to the backup snapshot policy. Backup agent 104 may receive an instruction to perform a backup snapshot from storage system 112. In some embodiments, backup agent 104 is optional. In the event primary system 102 does not include backup agent 104, an application associated with the one or more virtual machines 103 may cause a backup snapshot (full or incremental) of one or more of the virtual machine(s) 103.

Storage system 112 is comprised of a storage cluster that includes a plurality of storage nodes 111, 113, 115. Although three storage nodes are shown, storage system 112 may be comprised of n storage nodes. The plurality of storage nodes may be comprised of one or more solid state drives, one or more hard disk drives, one or more cache storages, or a combination thereof. Each storage node may have its own corresponding processor. Storage system 112 may be configured to ingest a backup snapshot received from primary system 102 and configured to store the data associated with the backup snapshot across the storage cluster. Storage system 112 may be a cloud version of a secondary storage system as described in U.S. patent application Ser. No. 16/287,214 entitled "Deploying A Cloud Instance Of A User Virtual Machine," filed on Feb. 27, 2019, the entire contents of which are incorporated by reference.

Storage system 112 may include a filesystem 117 that is configured to organize the filesystem data of the backup snapshot using a tree data structure as described in U.S. patent application Ser. No. 16/110,314 entitled "Incremental Virtual Machine Metadata Extraction," filed on Aug. 23, 2018, the entire contents of which are incorporated by reference. The tree data structure may provide a view of the filesystem data corresponding to a backup snapshot. The view of the filesystem data corresponding to the backup snapshot may be comprised of a filesystem metadata snapshot tree and one or more file metadata trees. The filesystem metadata snapshot tree is configured to store metadata associated with the filesystem data. A file metadata tree may correspond to one of the files included in the backup snapshot and store the metadata associated with a file. For example, a file metadata tree may correspond to a virtual machine container file (e.g., virtual machine image file, virtual machine disk file, etc.) associated with one of the one or more virtual machines 103.

Regardless if the view of the filesystem data corresponds to a full snapshot or an incremental snapshot, the view of the filesystem data corresponding to the backup snapshot is a fully hydrated backup snapshot that provides a complete view of primary system 102 corresponding to a moment in time when the backup snapshot was performed. A fully hydrated backup is a backup that is ready for use without having to reconstruct a plurality of backups to use it. Other systems may reconstruct a backup by starting with a full backup and applying one or more changes associated with one or more incremental backups to the data associated with the full backup. In contrast, any file stored in the storage volume of a primary system at a particular time and the file's contents, for which there is an associated backup snapshot, may be determined from the filesystem metadata snapshot tree, regardless if the associated backup snapshot was a full snapshot or an incremental snapshot.

Creating an incremental snapshot may only include copying data of the storage volume(s) that was not previously backed up. However, the filesystem metadata snapshot tree corresponding to the incremental snapshot provides a complete view of the storage volume(s) at the particular moment in time because it includes references to data of the storage volume that was previously stored. For example, a root node associated with the filesystem metadata snapshot tree may include one or more references to leaf nodes associated with one or more previous backup snapshots and one or more references to leaf nodes associated with the current backup snapshot. This provides significant savings in the amount of time needed to restore or recover a storage volume, virtual machine, and/or a database. In contrast, other recovery/restoration methods may require significant time, storage, and computational resources to reconstruct a particular version of a volume, virtual machine, and/or database from a full backup and a series of incremental backups. The view of filesystem data may allow any file (e.g., a virtual machine container file) that was stored on primary system 102 at the time the corresponding backup snapshot was performed, to be retrieved, restored, replicated, or started on storage system 112.

A filesystem metadata snapshot tree includes a root node, one or more levels of one or more intermediate nodes associated with the root node, and one or more leaf nodes associated with an intermediate node of the lowest intermediate level. The root node of a filesystem metadata snapshot tree includes one or more pointers to one or more intermediate nodes. The root node corresponds to a particular backup snapshot of filesystem data. Each intermediate node includes one or more pointers to other nodes (e.g., a lower intermediate node or a leaf node). A leaf node of the filesystem metadata snapshot tree may store data associated with a file for a file that is less than or equal to a limit size (e.g., 256 kB). A leaf node of the filesystem metadata snapshot tree may be an index node (inode). A leaf node of the filesystem metadata snapshot tree may store a pointer to a file metadata tree for a file that is greater than the limit size.

A file metadata tree includes a root node, one or more levels of one or more intermediate nodes associated with the root node, and one or more leaf nodes associated with an intermediate node of the lowest intermediate level. A leaf node of a filesystem metadata snapshot tree may include a pointer to the root node of the file metadata tree. A file metadata tree is similar to a filesystem metadata snapshot tree, but a leaf node of a file metadata tree may include an identifier of a data brick associated with one or more data chunks of the file. For example, a leaf node of a file metadata tree may include an identifier of a data brick associated with one or more data chunks of a virtual machine container file. The location of the data chunks associated with a data brick may be identified using a table stored in a metadata store that matches brick numbers (i.e., a brick identifier) to chunk identifiers (e.g., SHA-1) or the location of the data brick may be identified based on the pointer to the data brick. The brick identifier may be used to identify a corresponding chunk identifier. A file table may associate chunk identifiers (e.g., SHA-1) with chunk files. A virtual machine may be comprised of a plurality of chunk files. A chunk file is configured to store a plurality of data chunks. The file table may include to associate a location of a chunk identifier with an offset within a chunk file. The identified chunk identifier may be used to identify the chunk file that stores one or more data chunks associated with a file and a file offset within the identified chunk file.

Metadata store 114 may be distributed across storage nodes 111, 113, 115, that is, storage nodes 111, 113, 115 may store at least a portion of metadata store 114. In some embodiments, metadata store 114 is stored on one of the storage nodes 111, 113, 115. Metadata store 114 may be stored in the solid state drives of storage system 112, the one or more hard disk drives of storage system 112, the one or more cache storages of storage system 112, and/or a combination thereof. Metadata store 114 may be configured to store the metadata associated with primary system 102 that is included in a backup snapshot. Metadata store 114 may be configured to store the file metadata associated with a plurality of content files stored on storage system 112. For example, metadata store 114 may store the view of filesystem data corresponding to a backup snapshot (e.g., a snapshot tree and one or more file metadata structures).

Filesystem 117 may be configured to start one of the backed up virtual machines in virtual machine environment 118. The backed up virtual machine may be started based on a boot sequence associated with the backed up virtual machine. Filesystem 117 may retrieve from the storage nodes 111, 113, 115, the data blocks associated with a boot sequence of a backed up virtual machine. The data blocks associated with the boot sequence of the backed up virtual machine may be stored to one or more hard disks of the storage nodes 111, 113, 115.

Some of the data blocks associated with the boot sequence of the backed up virtual machine may be retrieved from the one or more hard disks of the storage nodes 111, 113, 115. For example, filesystem 117 may receive a request to retrieve one of the data blocks based on a boot sequence of the virtual machine. In response to the request, filesystem 117 may determine whether the requested data block has been prefetched to a cache storage. In the event the requested data block has not been prefetched to the cache storage, filesystem 117 may retrieve the requested data block from the one or more hard disks of the storage nodes 111, 113, 115 and provide the requested data block to virtual machine environment 118.

Some of the data blocks associated with the boot sequence of the backed up virtual machine may be prefetched from a storage of the storage nodes 111, 113, 115 (e.g., one or more hard disks and/or solid state drives), that is, one or more data blocks may be prefetched before the one or more data blocks are needed in the boot sequence of the backed up virtual machine. For example, filesystem 117 may receive a request to retrieve one of the data blocks based on a boot sequence of the virtual machine. In response to the request, filesystem 117 may determine whether the requested data block has been prefetched to a cache storage. In the event the requested data block has been prefetched to the cache storage, filesystem 117 may retrieve the requested data block from the cache storage and provide the requested data block to virtual machine environment 118.

Storage system 112 may have a single filesystem 117 for the plurality of storage nodes 111, 113, 115. In some embodiments, each of the storage nodes 111, 113, 115 has a corresponding filesystem that is configured to retrieve data blocks from a cache storage or from a storage (e.g., disk). Virtual machine environment 118 may be running on one of the storage nodes 111, 113, 115 or distributed between a plurality of the storage nodes 111, 113, 115.

Figure 2:
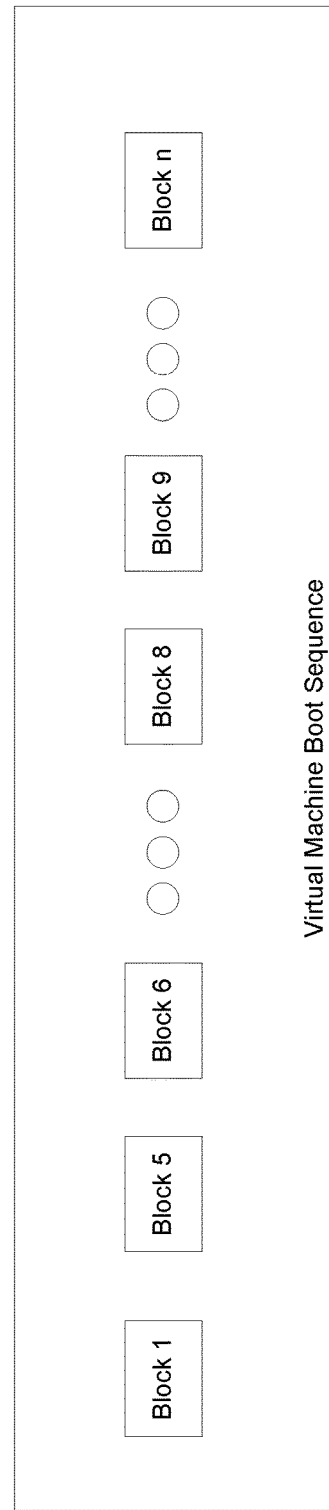
FIG. 2 is a block diagram illustrating an embodiment of a virtual machine boot sequence.

FIG. 2 is a block diagram illustrating an embodiment of a virtual machine boot sequence. Virtual machine boot sequence 200 is comprised of n data blocks. A virtual machine may be started using virtual machine boot sequence 200. For example, "Block 1" is first loaded into a virtual machine environment, then "Block 5" is loaded into the virtual machine environment, then "Block 6" is loaded into the virtual machine environment, . . . , then "Block 8" is loaded into the virtual machine environment, then "Block 9" is loaded into the virtual machine environment, . . . , and "Block n" is loaded into the virtual machine environment.

A prediction engine may predict that one or more data blocks will be loaded into the virtual machine environment and send a request to a prefetch engine to prefetch to a cache storage the one or more predicted data blocks before the one or more predicted data blocks need to be loaded into the virtual machine environment.

The prediction engine may monitor virtual machine boot sequence 200. The prediction engine may monitor a threshold number of data block requests. The prediction engine may predict one or more subsequent data blocks associated with the boot sequence based on the monitored threshold number of data block requests. In some embodiments, the prediction engine may predict one or more subsequent data blocks associated with the boot sequence based on a last n requested data block(s). In some embodiments, n is equal to two.

For example, a prediction engine may monitor a start of a virtual machine associated with virtual machine boot sequence 200 and determine that the virtual machine boot sequence 200 has a boot sequence order of "Block 1," "Block 5," and "Block 6." Based on the monitored boot sequence, the prediction engine may predict that "Block 8" and "Block 9" will be used to start the virtual machine associated with virtual machine boot sequence 200. The prediction engine sends a request to a prefetch engine to prefetch to a cache storage "Block 8" and "Block 9" before "Block 8" and "Block 9" need to be loaded into the virtual machine environment.

Figure 3:
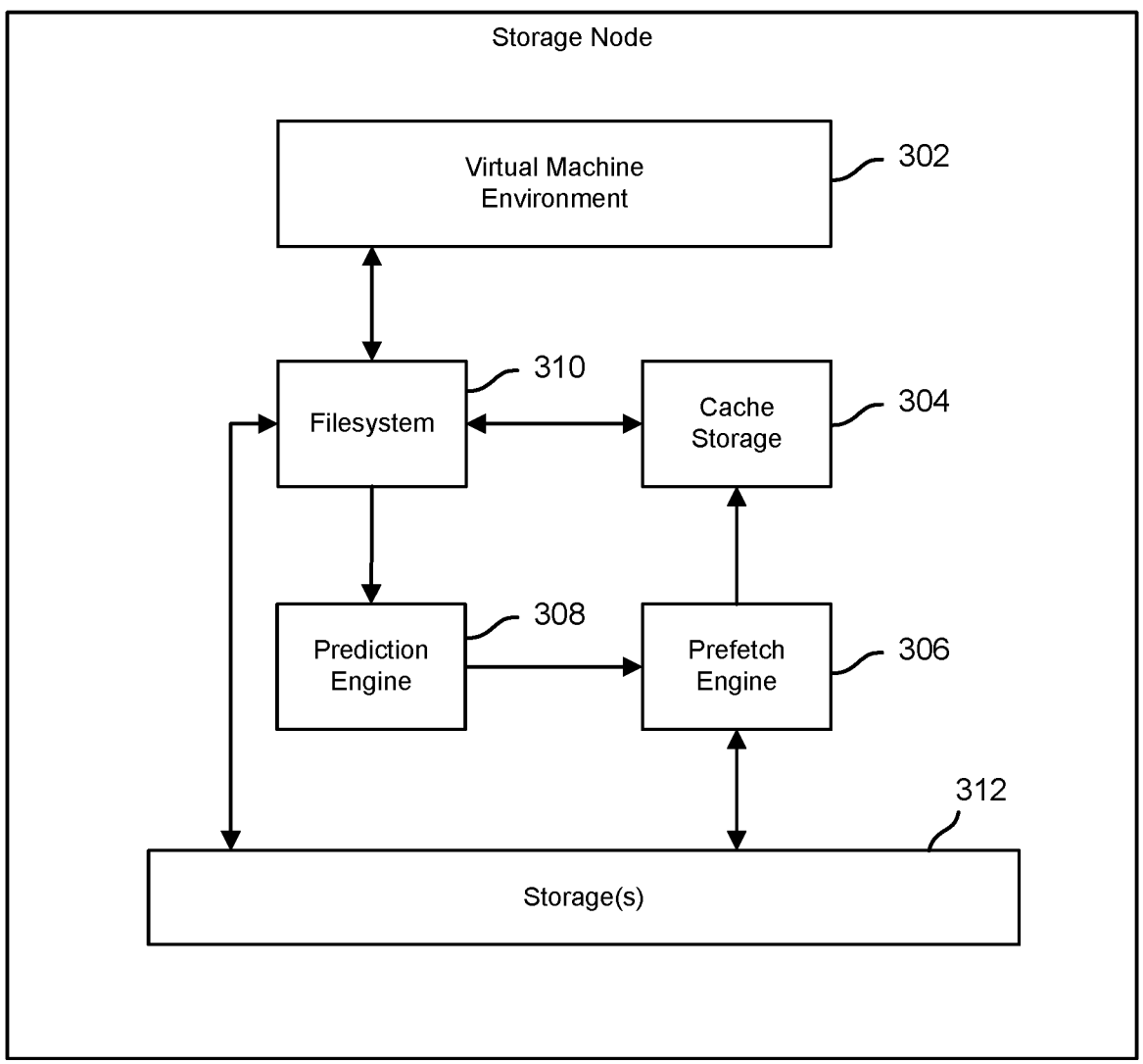
FIG. 3 is a block diagram illustrating an embodiment of a storage node.

FIG. 3 is a block diagram illustrating an embodiment of a storage node. In the example shown, storage node 300 may be implemented by any of the storage nodes 111, 113, 115.

Storage node 300 is comprised of a virtual machine environment 302, cache storage 304, prefetch engine 306, prediction engine 308, filesystem 310, and one or more storages 312 (e.g., raw disk, virtual disk, hard disk, flash drive, tape devices, offboard storage, networked storage, cloud storage, a subsystem that stores the virtual machine execution data blocks, filesystem, file exposed as a disk (e.g., using SCSI protocol), raw filesystem, etc.).

Filesystem 310 may receive a request to start a virtual machine in virtual machine environment 302. Filesystem 310 may load the data blocks associated with the boot sequence of the virtual machine from the one or more storages 312 to virtual machine environment 302. Filesystem 310 may load the data blocks in an order corresponding to the boot sequence of the virtual machine.

Prediction engine 308 may monitor the order in which filesystem 310 is retrieving data blocks from the one or more storages 312 and loading the retrieved data blocks to virtual machine environment 302 (e.g., hypervisor). Each time a data block associated with the boot sequence is being loaded to virtual machine environment 302, prediction engine 308 may predict one or more data blocks associated with the boot sequence of the virtual machine prior to the one or more data blocks being loaded to virtual machine environment 302 from the one or more storages 312. Prediction engine 308 may send a request to prefetch engine 306 to prefetch the one or more predicted data blocks from the one or more storages 312. In response to the prefetch request, prefetch engine 306 may fetch the one or more requested data blocks from the one or more storages 312 and store the one or more requested data blocks in cache storage 304.

For the example, the first three data blocks of the boot sequence may have been loaded to virtual machine environment 302. Prediction engine 308 may predict the fourth and fifth data blocks of the boot sequence based on the first three data blocks. Prediction engine 308 may send to prefetch engine 306 a request to prefetch the data blocks corresponding to the fourth and fifth data blocks of the boot sequence. In response to the request, prefetch engine 306 may prefetch the data blocks corresponding to the fourth and fifth data blocks of the boot sequence from the one or more storages 312 and store the data blocks corresponding to the fourth and fifth data blocks of the boot sequence in cache storage 304. The one or more prefetched data blocks may overwrite the least recently used data block(s) stored in cache storage 304.

In some embodiments, prefetch engine 306 retrieves the data blocks from the one or more storages 312. In some embodiments, prefetch engine 306 forwards to a prefetch engine hosted on a different storage node the request for one or more data blocks. In response to the request, the prefetch engine hosted on the different storage node retrieves the one or more requested data blocks from the one or more storages of the different storage node and provides the one or more requested data blocks to prefetch engine 306. In response to receiving the one or more requested data blocks, prefetch engine 306 is configured to store the one or more received data blocks to cache storage 304.

Each time a data block associated with the boot sequence is requested, filesystem 310 may determine whether the next data block in the virtual machine boot sequence has been prefetched to cache storage 304. In the event the next data block in the virtual machine boot sequence is stored in cache storage 304, filesystem 310 may load the data block from cache storage 304 to virtual machine environment 302 instead of loading the data block from the one or more storages 312 to virtual machine environment 302. This may reduce the overall time to start the virtual machine because loading a data block from cache storage 304 to virtual machine environment 302 is faster than loading the data block from the one or more storages 312 to virtual machine environment 302. In the event the next data block in the virtual machine boot sequence is not stored in cache storage 304, filesystem 310 may load the data block from the one or more storages 312 to virtual machine environment 302. In some embodiments, filesystem 310 loads a data block from the one or more storages 312 to virtual machine environment 302 because prediction engine 308 has not made a prediction (e.g., an initial number of data blocks of the boot sequence below a threshold number are loaded into virtual machine environment 302 before prediction engine 308 is configured to make a prediction). In some embodiments, filesystem 310 loads a data block from the one or more storages 312 to virtual machine environment 302 because prediction engine 308 made an incorrect prediction (e.g., one or more data blocks not included in the virtual machine boot sequence have been prefetched to cache storage 304).

Figure 4:
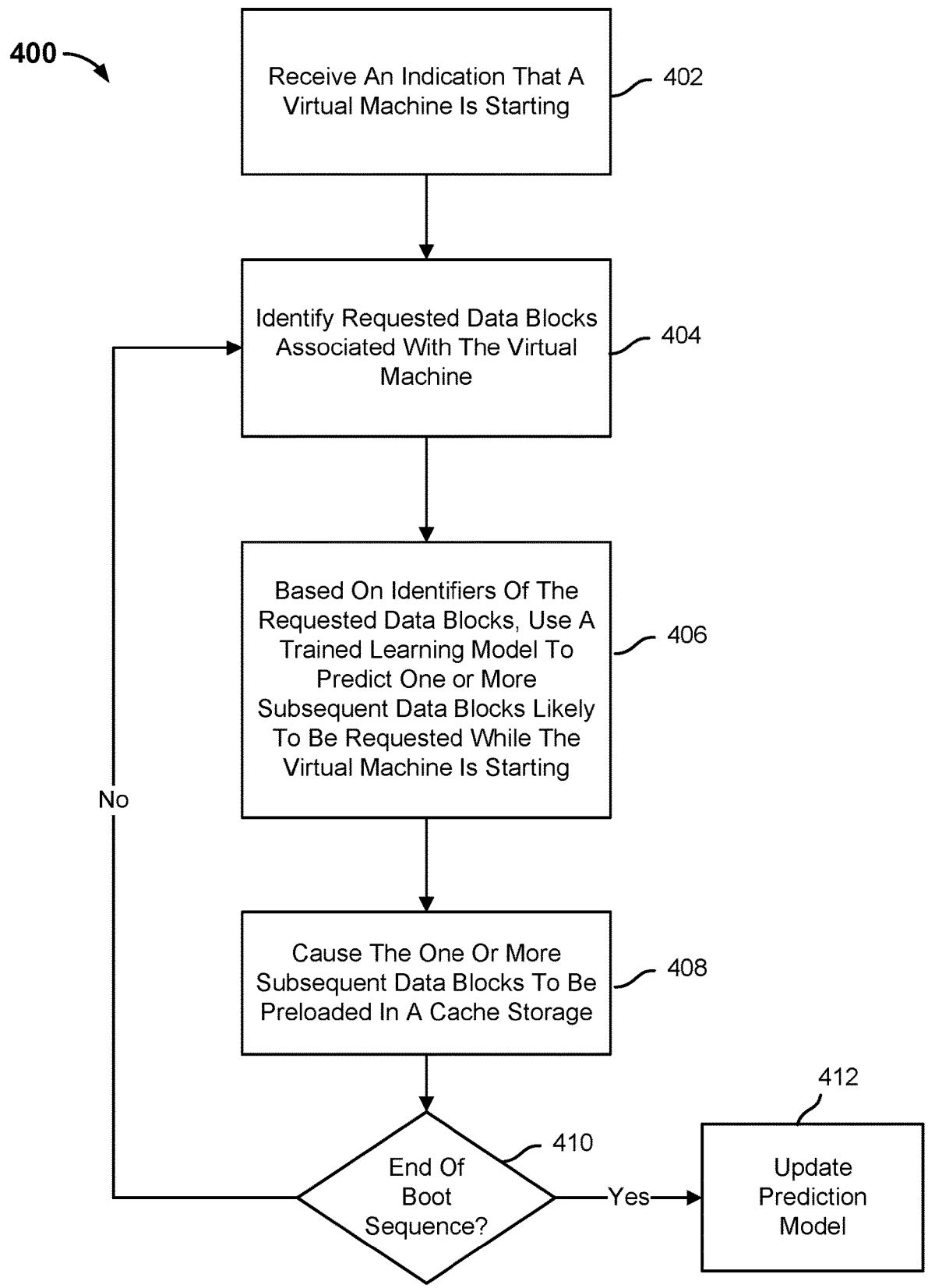
FIG. 4 is a flow chart illustrating an embodiment of a process for prefetching boot sequence data blocks.

FIG. 4 is a flow chart illustrating an embodiment of a process for prefetching boot sequence data blocks. In some embodiments, process 400 is implemented by a storage system, such as storage system 112. In some embodiments, process 400 is implemented by a prediction engine, such as prediction engine 308.

At 402, an indication that a virtual machine is starting is received. A storage system may receive a request to start a virtual machine. For example, a remote computer may send to the storage system a request to start the virtual machine on the storage system. In other embodiments, a user associated with a storage system sends a request to start a particular version of a virtual machine. In response to the request, the storage system may start the particular version of the virtual machine in a virtual machine environment. In response to the request, the storage system may provide to a prediction engine the indication that the virtual machine is starting.

At 404, one or more requested data blocks associated with the virtual machine are identified. The prediction engine may monitor an order of the data blocks associated with a boot sequence of the virtual machine. The boot sequence associated with the virtual machine is comprised of a plurality of data blocks. The prediction engine may identify the data blocks associated with the boot sequence that are being loaded to the virtual machine environment.

At 406, based on identifiers of the requested data blocks, a trained learning model is used to predict one or more subsequent data blocks likely to be requested while the virtual machine is starting. A model may be trained to predict one or more data blocks in a boot sequence. A boot sequence of a virtual machine may be learned each time a virtual machine is run on a storage system. The boot sequence may be provided as input to train a model. The model may develop a graph structure for a plurality of virtual machines. The graph structure may be comprised of a plurality of branches where each branch corresponds to one of the plurality of virtual machines. A branch may be comprised of a plurality of states. Each state of a branch may correspond to a data block included in the boot sequence. Each subsequent state of a branch may correspond to a next data block included in the boot sequence, i.e., the first state of a branch corresponds to an initial data block of the boot sequence and a last state of the branch corresponds to the last data block of the boot sequence. Some of the branches of the graph structure may overlap, i.e., a data block is included in a plurality of boot sequences. A parent state may have one or more pointers to one or more child states. In some embodiments, a state may reference itself. In some embodiments, a child state may reference a parent state or a grandparent state. The model may be a Markov chain based prediction engine where corresponding probabilities are associated with each of the child states. In some embodiments, the model is a machine learning model that is trained to predict one or more subsequent data blocks based on a current data block being loaded. In some embodiments, the model is a machine learning model (e.g., unsupervised, supervised, linear regression, decision tree, support vector machine, naïve Bayes, random forest, etc.) that is trained to predict one or more subsequent data blocks based on a current data block being loaded and one or more previous data blocks that were loaded. The machine learning model may be configured to predict the one or more likely subsequent data blocks. The machine learning model may be configured to send to the prefetch engine a request for one or more data blocks having a confidence level greater than a confidence threshold.

The prediction engine may monitor a threshold number of data block requests and predict the subsequent data block associated with the boot sequence based on the monitored threshold number of data block requests. In some embodiments, the threshold number of previous data block requests is equal to two. For example, the prediction engine may determine that the second and third data blocks of the boot sequence are "Block 7" and "Block 5." Using the graph structure of the model, the prediction engine may determine that for a virtual machine boot sequence where the second and third data blocks of the boot sequence are "Block 7" and "Block 5," the fourth block of the boot sequence is likely to be "Block 9" and the fifth block of the boot sequence is likely to be "Block 25."

The prediction engine may predict one or more subsequent data blocks associated with the boot sequence each time a data block is loaded into a virtual machine environment. In some embodiments, the prediction engine predicts one or more subsequent data blocks associated with the boot sequence based on a last n requested data block(s). In some embodiments, n is equal to two.

The predicted subsequent data block may be a threshold number of data blocks after the data block currently being loaded. In some embodiments, the threshold number of data blocks is one. For example, the fourth data block of the virtual machine boot sequence may be loaded from a storage to a virtual machine environment. The prediction engine may predict the fifth data block of the virtual machine boot sequence. In some embodiments, the threshold number of data blocks is greater than one. For example, the fourth data block of the virtual machine boot sequence may be loaded from a storage to a virtual machine environment. The prediction engine may predict the seventh data block of the virtual machine boot sequence (e.g., the threshold number of data blocks=3) while the fourth data block of the virtual machine boot sequence is being loaded from the storage to the virtual machine environment.

At 408, the subsequent data block is caused to be preloaded to a cache storage. A prediction engine may send to a prefetch engine a request to prefetch the subsequent data block from a storage. In response to the request, the prefetch engine may be configured to retrieve the requested data block from the storage and store the requested data block in a cache storage. The subsequent data block may overwrite the least recently used data block stored in the cache storage.

At 410, it is determine whether the boot sequence has ended. In some embodiments, the boot sequence is determined to have ended in the event a threshold amount of time has passed (e.g., 1 minute) since the virtual machine began its boot sequence. In some embodiments, the boot sequence is determined to have ended in the event a rate at which data blocks associated with the virtual machine are requested is less than a threshold rate. For example, the rate at which data blocks associated with the virtual machine are requested may be higher during a boot sequence of the virtual machine than when the virtual machine is started. In some embodiments, the boot sequence is determined to have ended when a hit/miss rate (ratio of correctly predicted data blocks to incorrectly predicted data blocks) is less than a threshold. In the event the boot sequence has not ended, process 400 returns to 404. In the event the boot sequence has ended, process 400 proceeds to 412.

At 412, a prediction model is updated. A model may be trained to predict one or more data blocks associated with a virtual machine boot sequence. The actual boot sequence associated with the virtual machine may be applied as an input to the model. In response, the model may update its model such that it includes an additional branch that corresponds to the boot sequence of the virtual machine. The additional branch may be comprised of a plurality of states. Each state may correspond to one of the data blocks included in the virtual machine boot sequence. The first state of the Markov chain may correspond to an initial data block of the virtual machine boot sequence. A last state of the branch may correspond to a last data block of the virtual machine boot sequence.

Figure 5:
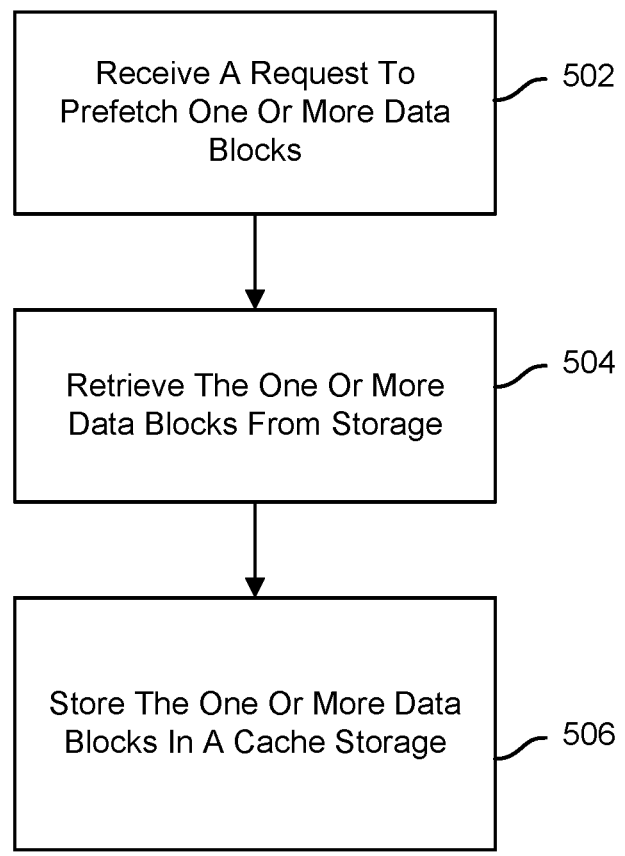
FIG. 5 is a flow chart illustrating an embodiment of a process for prefetching boot sequence data blocks.

FIG. 5 is a flow chart illustrating an embodiment of a process for prefetching boot sequence data blocks. Process 500 may be implemented by a prefetch engine, such as prefetch engine 306.

At 502, a request to prefetch one or more data blocks is received. The one or more data blocks may be associated with a virtual machine boot sequence. The one or more requested data blocks may correspond to data blocks of the virtual machine boot sequence that have not been loaded into a virtual machine environment.

The requested data block may be a threshold number of data blocks after the data block currently being loaded. In some embodiments, the threshold number of data blocks is one. For example, the fourth data block of the virtual machine boot sequence may be loaded from a storage to a virtual machine environment. The prediction engine may predict the fifth data block of the virtual machine boot sequence. In some embodiments, the threshold number of data blocks is greater than one. For example, the fourth data block of the virtual machine boot sequence may be loaded from a storage to a virtual machine environment. The prediction engine may predict the seventh data block of the virtual machine boot sequence (e.g., the threshold number of data blocks=3) while the fourth data block of the virtual machine boot sequence is being loaded from the storage to the virtual machine environment. The prediction engine may send a request to prefetch the predicted seventh data block.

At 504, the one or more requested data blocks are retrieved. The one or more requested data blocks may be retrieved from storage.

At 506, the one or more requested data blocks are stored in a cache storage. The one or more requested data blocks may be stored in the cache storage. Each time a filesystem receives a request to load a data block into a virtual machine environment to start the virtual machine, the filesystem may check to see if the requested data block is stored in the cache storage. In the event the requested data block is stored in the cache storage, the filesystem may load the requested data block from the cache storage instead of from storage. This reduces the amount of time to start the virtual machine because retrieving a data block from cache storage is faster than retrieving the data block from storage.

Figure 6:
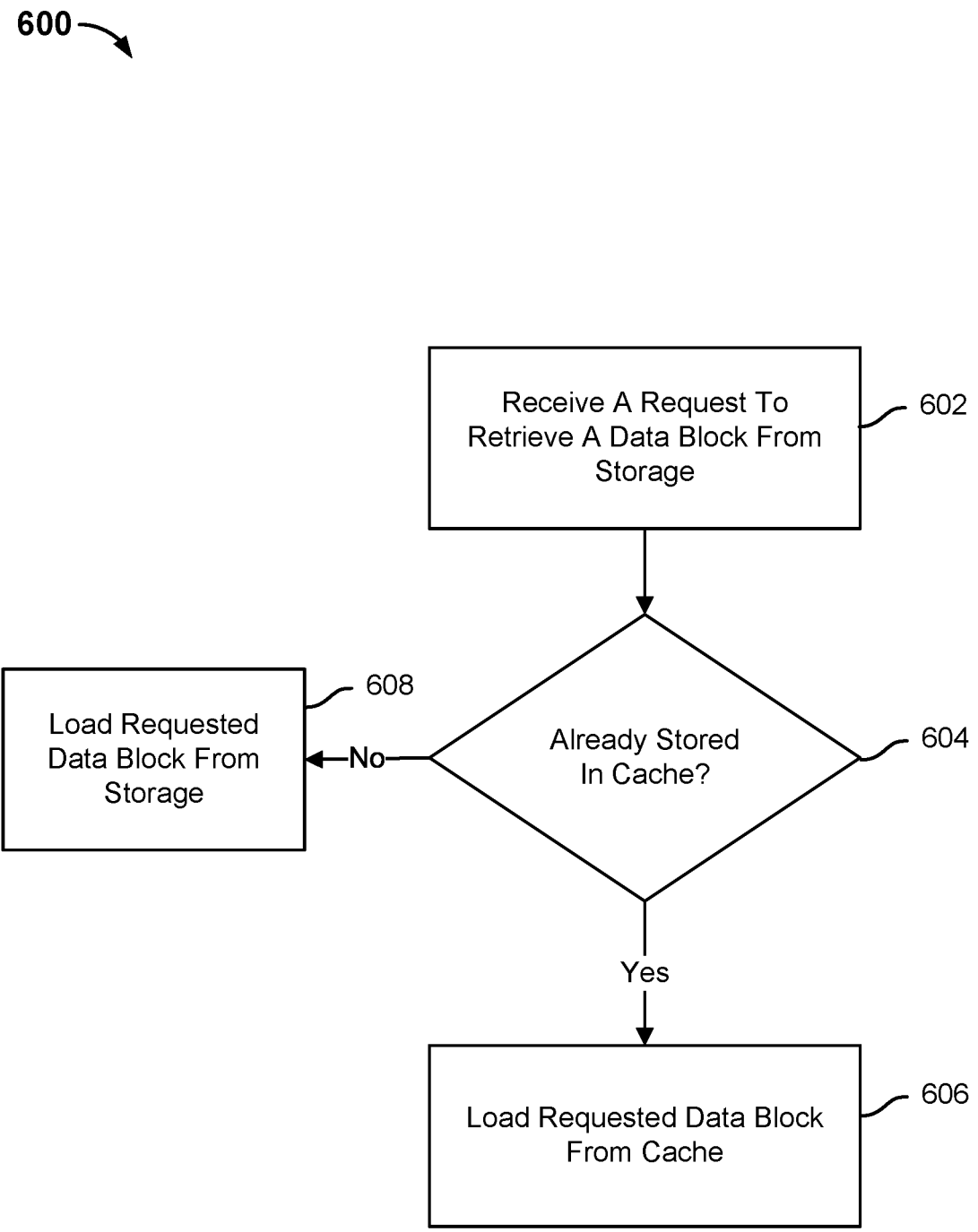
FIG. 6 is a flow chart illustrating an embodiment of a process for starting a virtual machine.

FIG. 6 is a flow chart illustrating an embodiment of a process for starting a virtual machine. Process 600 may be implemented by a filesystem, such as filesystem 310 or filesystem 117.

At 602, a request to retrieve a data block from storage is received. The requested data block may be a next data block in a boot sequence associated with a virtual machine. The storage may be a raw disk, a virtual disk, a hard disk, a flash drive, a tape device, offboard storage, a networked storage, a cloud storage, a subsystem that stores the virtual machine execution data blocks, a filesystem, a file exposed as a disk (e.g., using SCSI protocol), a raw filesystem, etc. At 604, it is determined whether the requested data block is already stored in a cache storage. In the event the requested data block is already stored in a cache storage, process 600 proceeds to 606. In the event the requested data block is not already stored in the cache storage, process 600 proceeds to 608. At 606, the requested data block is loaded from cache to a virtual machine environment. At 608, the requested data block is loaded from storage to the virtual machine environment. The amount of time needed to start the virtual machine may be reduced based on the number of data blocks associated with the virtual machine boot sequence that are fetched from the cache storage instead of storage because it is faster for the filesystem to retrieve a data block from cache storage instead of the storage.

Figure 7:
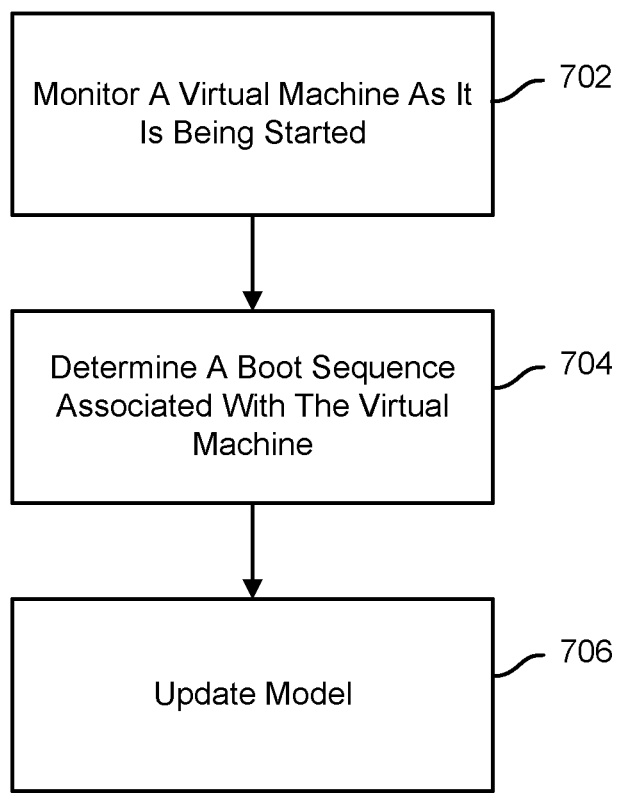
FIG. 7 is a flow chart illustrating an embodiment of a process for training a model.

FIG. 7 is a flow chart illustrating an embodiment of a process for training a model. Process 700 may be implemented by a prediction engine, such as prediction engine 308.

At 702, a virtual machine is monitored as it is being started for some or all of its boot sequence. A virtual machine may be started in a virtual machine environment. A user associated with a storage system may send a request to start a particular version of a virtual machine. In response to the request, the storage system may start the particular version of the virtual machine in the virtual machine environment.

At 704, a boot sequence associated with the virtual machine is determined. The boot sequence associated with the virtual machine is comprised of a plurality of data blocks. The plurality of data blocks are loaded to the virtual machine environment in a specific order. The specific order in which the plurality of data blocks associated with the boot sequence are loaded to the virtual machine environment is determined.

At 706, a model is updated. A model may be trained to predict one or more data blocks associated with a virtual machine boot sequence. The determined boot sequence may be applied as an input to the model. In response, the model may update its model such that it includes an additional branch that corresponds to the determined boot sequence. The additional branch may be comprised of a plurality of states. Each state may correspond to one of the data blocks included in the virtual machine boot sequence. The first state of the branch may correspond to an initial data block of the virtual machine boot sequence. A last state of the branch may correspond to a last data block of the virtual machine boot sequence.

Figure 8:
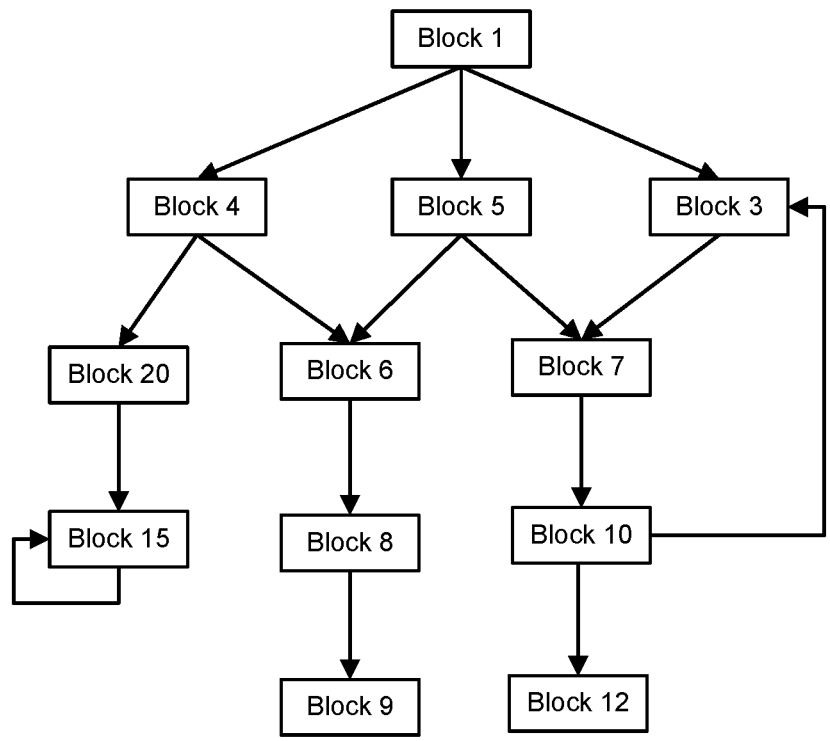
FIG. 8 is a block diagram illustrating a graph structure of a model in accordance with some embodiments.

FIG. 8 is a block diagram illustrating a graph structure of a model in accordance with some embodiments. In the example shown, graph structure 800 illustrates the boot sequence associated with five different virtual machines. Graph structure 800 may be comprised of a plurality of branches where each branch corresponds to one of the plurality of virtual machines.

Graph structure 800 may be comprised of a plurality of branches (paths) where each branch corresponds to one of the plurality of virtual machines. A branch may be comprised of a plurality of states. Each state of a branch may correspond to a data block included in the boot sequence associated with a virtual machine. Each subsequent state of a branch may correspond to a next data block included in the boot sequence associated with a virtual machine, i.e., the first state of a branch corresponds to an initial data block of the boot sequence and a last state of the branch corresponds to the last data block of the boot sequence. Some of the branches of the graph structure may overlap, i.e., a data block is included in the plurality of boot sequences. For example, "Block 7," "Block 10," and "Block 12" are included in the boot sequences associated with two different virtual machines. A parent state may have one or more pointers to one or more child states. For example, "Block 4" includes a first pointer to "Block 20" and a second pointer to "Block 6." "Block 5" includes a first pointer to "Block 6" and a second pointer to "Block 7." A child state may have a pointer to an elder state (e.g., parent state, grandparent state). For example, "Block 10" includes a pointer to "Block 3." A state may include a self-referential pointer (i.e., a self-referential loop). For example "Block 15" includes a pointer to itself.

In the example shown, a first virtual machine is associated with a boot sequence of "Block 1," "Block 4," "Block 20," and "Block 15." A second virtual machine is associated with a boot sequence of "Block 1," "Block 4," "Block 6," "Block 8," and "Block 9." A third virtual machine is associated with a boot sequence of "Block 1," "Block 5," "Block 6," "Block 8," and "Block 9." A fourth virtual machine is associated with a boot sequence of "Block 1," "Block 5," "Block 7," "Block 10," and "Block 12." A fifth virtual machine is associated with a boot sequence of "Block 1," "Block 3," "Block 7," "Block 10," and "Block 12." Although the example shows a virtual machine having a boot sequence with four or five blocks, a virtual machine may be associated with a boot sequence having m number of blocks, where m is a number greater than 0.

A filesystem may receive corresponding requests for a plurality of data blocks associated with a virtual machine boot sequence each time a virtual machine is started. The requests are received in an order associated with the virtual machine boot sequence. For example, a filesystem may receive a request for "Block 1," then a second request for "Block 4," then a third request for "Block 20," and then a fourth request for "Block 15." The data blocks associated with the virtual machine boot sequence may be located at non-contiguous portions of a storage, such as a disk. The disk may be required to spin up each time a data block of the virtual machine boot sequence is requested.

Graph structure 800 may be used to predict one or more data blocks associated with a boot sequence. A prediction engine may use one or more requested data blocks associated with a virtual machine boot sequence to predict one or more subsequent data blocks associated with the virtual machine boot sequence. For example, a prediction engine may use the last two requested data blocks associated with a virtual machine boot sequence to predict one or more subsequent data blocks associated with the virtual machine boot sequence. "Block 1" and "Block 5" may have been requested and loaded into a virtual machine environment used to start the virtual machine.

The prediction engine may send to a prefetch engine a request to prefetch one or more data blocks associated with a virtual machine boot sequence. Each data block may have an associated probability of being included in a virtual machine boot sequence. The associated probability may change as more and more data blocks are loaded into the virtual machine environment used to start the virtual machine. In the event "Block 1" and "Block 5" have been requested, "Block 6" and "Block 7" have a greater than zero probability of being requested. In some embodiments, "Block 6" and "Block 7" have the same probability of being requested. In other embodiments, "Block 6" has a greater probability of being requested than "Block 7." In other embodiments, "Block 7" has a greater probability of being requested than "Block 6." In the event the probabilities are equal, the prediction engine may send to the prefetch engine a request to prefetch both "Block 6" and "Block 7." In the event the probabilities are not equal, the prediction engine may send to the prefetch engine a request to prefetch the data block having the greater probability. In some embodiments, the prefetch engine not only sends a request for "Block 6," but the request also includes a request for "Block 8." In some embodiments, the prefetch engine not only sends a request for "Block 7," but the request also includes a request for "Block 10."

Although graph structure 800 depicts the boot sequence of each virtual machine starting with "Block 1," graph structure 800 may include boot sequences of virtual machines having different starting data blocks, such as "Block 100." This may occur when different types of virtual machines are started in a virtual machine environment (e.g., Ubuntu VMs, Windows VMs, etc.).

Each time a virtual machine is started in a virtual machine environment, the boot sequence associated with the virtual machine may be learned and used to update graph structure 800. The boot sequence associated with the virtual machine may be provided as input to a model, and in response, graph structure 800 may be updated to include a branch that corresponds to the boot sequence associated with the virtual machine.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving an indication that a virtual machine is starting;
   identifying requested data blocks associated with the virtual machine;
   based on identifiers of the requested data blocks, using a trained learning model to predict one or more subsequent data blocks likely to be requested while the virtual machine is starting;
   causing the one or more subsequent data blocks to be preloaded from a storage to a cache storage;
   determining that the one or more predicted subsequent data blocks are incorrect;
   monitoring a boot sequence of the virtual machine; and
   using the trained learning model to make one or more additional predictions.

2. The method of claim 1, wherein the identifiers of the requested data blocks are associated with the boot sequence of the virtual machine.

3. The method of claim 1, wherein the one or more subsequent data blocks are a threshold number of data blocks after a first data block being loaded.

4. The method of claim 1, wherein the one or more additional predictions are based on the monitored boot sequence of the virtual machine.

5. The method of claim 1, wherein the one or more additional predictions are directed to one or more other data blocks to be included in the boot sequence of the virtual machine.

6. The method of claim 5, further comprising causing the one or more other data blocks to be prefetched.

7. The method of claim 1, further comprising determining the virtual machine has started.

8. The method of claim 7, wherein the virtual machine is determined to have started based on a frequency at which data blocks are requested.

9. The method of claim 8, wherein the frequency is less than a threshold frequency.

10. The method of claim 7, further comprising updating the trained learning model based on an actual boot sequence associated with the virtual machine.

11. The method of claim 1, wherein causing the one or more subsequent data blocks to be preloaded in the cache storage comprises sending to a prefetch engine a request for the one or more subsequent data blocks.

12. The method of claim 11, wherein in response to receiving from the request for the one or more subsequent data blocks, the prefetch engine retrieves the one or more subsequent data blocks from storage and stores the one or more subsequent data blocks in the cache storage.

13. The method of claim 1, wherein a filesystem retrieves the one or more subsequent data blocks from the cache storage and loads the one or more subsequent data blocks to a virtual machine environment associated with the virtual machine.

14. The method of claim 1, wherein the trained learning model uses a graph structure to predict the one or more subsequent data blocks likely to be requested while the virtual machine is starting.

15. The method of claim 14, wherein the graph structure is comprised of a plurality of branches, wherein each branch corresponds to a different virtual machine.

16. The method of claim 15, wherein each branch of the plurality of branches is comprised of a plurality of states, wherein each state corresponds to a data block of the boot sequence.

17. The method of claim 1, wherein the one or more subsequent data blocks include a plurality of data blocks that are caused to be preloaded in the cache storage.

18. The method of claim 17, wherein the plurality of data blocks are sequential data blocks.

19. A computer program product, the computer program product being embodied in a non-transitory computer readable storage medium and comprising computer instructions for:

receiving an indication that a virtual machine is starting;
identifying requested data blocks associated with the virtual machine;
based on identifiers of the requested data blocks, using a trained learning model to predict one or more subsequent data blocks likely to be requested while the virtual machine is starting;
causing the one or more subsequent data blocks to be preloaded in a cache storage;
determining that the one or more predicted subsequent data blocks are incorrect;
monitoring a boot sequence of the virtual machine; and
using the trained learning model to make one or more additional predictions.

20. A system, comprising:
a processor configured to:
receive an indication that a virtual machine is starting;
identify requested data blocks associated with the virtual machine;
based on identifiers of the requested data blocks, use a trained learning model to predict one or more subsequent data blocks likely to be requested while the virtual machine is starting;
cause the one or more subsequent data blocks to be preloaded in a cache storage;
determine that the one or more predicted subsequent data blocks are incorrect;
monitor a boot sequence of the virtual machine; and
use the trained learning model to make one or more additional predictions; and
a memory coupled to the processor and configured to provide the processor with instructions.

* * * * *